Nov. 6, 1923.

L. R. DAVIS 1,472,903

CUSHION TIRE AND MANUFACTURE THEREOF

Filed Feb. 17, 1922

INVENTOR.
LAURENCE R. DAVIS,
BY
HIS ATTORNEY.

Patented Nov. 6, 1923.

1,472,903

UNITED STATES PATENT OFFICE.

LAURENCE R. DAVIS, OF WEEHAWKEN, NEW JERSEY, ASSIGNOR TO PROVIDENCE RUBBER COMPANY, A CORPORATION OF RHODE ISLAND.

CUSHION TIRE AND MANUFACTURE THEREOF.

Application filed February 17, 1922. Serial No. 537,179.

*To all whom it may concern:*

Be it known that I, LAURENCE R. DAVIS, a citizen of the United States, residing at Weehawken, county of Hudson, State of New Jersey, have invented certain new and useful Improvements in Cushion Tires and Manufacture Thereof, of which the following is a full, clear, and exact description.

This invention relates to the manufacture of solid tires and in particular a cushion or yielding type thereof equipped with a metallic base for attachment by pressure to a wheel as distinguished from those types which are demountably secured by bolts and flanges.

Heretofore cushion types of solid tires— by which I mean those types of solid tires which are provided with cavities, recesses, or other formations, to permit the constituent masses of rubber in service to swell or expand in directions more or less parallel to the base—have been secured to the wheel by bolts passed through side-flanges and the felloe of the wheel. More recently it has been proposed to vulcanize this type of tires to a base-band sectioned circumferentially into a plurality of parts for permitting molding projections to be removed after curing. But both procedures are objectionable on one ground or another.

The present invention contemplates a cushion or yielding solid tire, having one or more internal cavities, which is secured, after curing, upon a metallic base or band, one or both of whose margins is subsequently upturned to form lateral flanges preventing sidewise shift.

With the illustrated embodiment in mind and without unnecessary limiting intention, the invention briefly may be said to consist in curing a tire in desired form, preferably with fabric incorporated in its base, and subsequently mounting the tire on to an undersized metallic annular base, one or both of whose margins is afterwards spun or otherwise upturned to form restraining flanges. The base is then enlarged or stretched circumferentially ready for pressing upon the felloe of a wheel.

A preferred embodiment of the invention is illustrated in the accompanying drawings in which:—

Figure 1:
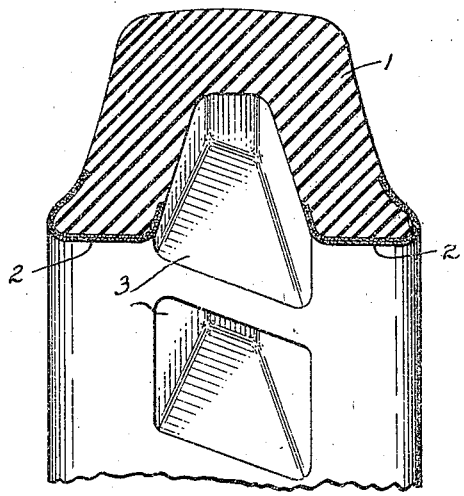
Figure 2:
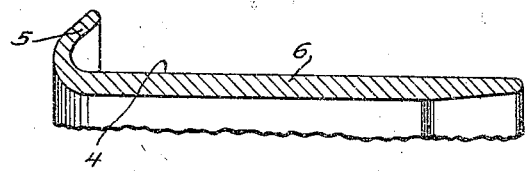
Figure 3:
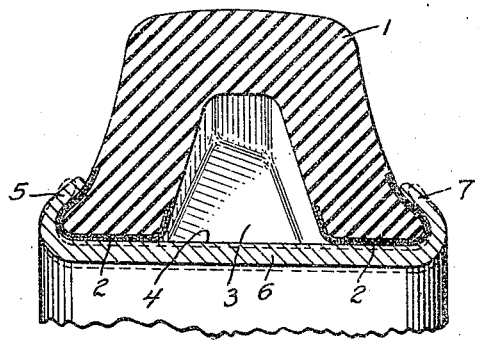

Fig. 1 shows the body portion of the tire in a vulcanized or cured condition ready for mounting on its metallic base, Fig. 2 illustrates the preferred form of the undersized metallic base or band upon which the tire is mounted by stretching and pressing, and Fig. 3 shows in cross-section the complete or finished tire mounted on its base ready to be pressed upon the felloe of a wheel.

According to my invention, I amass the tire constituents—vulcanizable rubber 1 and preferably also fabric 2—roughly in the relation and form shown in the drawing with one or more internal cavities 3. I may make any suitable number of the cavities, or only one, in the form of an annular channel which is open toward the base of the tire. The particular form and construction of the tire may be varied as desired to furnish the requisite cushioning properties, the form being widely variable as shown in the prior art, and it is not my intention to limit myself to any one form. The resulting annulus is then placed in a mold with an internal segmental ring carrying projections corresponding to the shape of the channel or cavities desired, and the tire cured as convenient.

The tire is then assembled upon a metallic base. In Fig. 2, I have shown a base at 4 of suitable form. This preferably has an upstanding already formed flange 5 and its cylindrical portion 6 is preferably of an external diameter to permit slipping the vulcanized tire into position thereon snugly but without difficulty. After mounting the tire, I then spin up the flat margin of the base to form a second restraining flange 7.

The metallic rim on which the tire is thus mounted is smaller in circumference than will permit it to be pressed upon a felloe. Consequently, I then expand or elongate it circumferentially, increasing its diameter, for instance, from one-quarter to one-half an inch, according to the properties of the metal in the band and its thickness, the amount of expansion being variable to suit the conditions. This expansion of the band—which is indicated in Fig. 3— may be done in any suitable manner but preferably in a way known as "bulldozing," well known in the wheel or rim industry and consisting essentially of a chuck having a number of segments expansible by a cone drawn axially of the chuck.

From the foregoing description, it will be clear that my procedure enables the tire to be readily manipulated and vulcanized with any desired internal shaping. The base or flange regions of the tire may have fabric, semi-hard rubber or other reinforcements and anchorages, incorporated therein. The tire being cured with its inner circumference approximating the outer circumference of the base-band, it may be readily positioned properly thereon preliminary to the spinning or upturning of its second restraining flange. By the final or "bulldozing" operation, i. e., the expansion of the metallic base to the exact size suited for pressure application to the felloe of the wheel, the necessity of precise dimensioning in the previous stages of the manufacture is avoided. Furthermore, the extent of expansion in the felloe seating portion of the base-band being greater than in the side-flanges, the latter bend or swing inward and downward (as indicated in dotted lines in Fig. 3) with a consequential desirable gripping or pinching action upon the side walls adjacent the base of the tire. The tire, of course, is also stretched circumferentially and tightly clasped about the metallic base.

It is to be understood that the principle of the invention is not confined to the precise procedure above set forth as any procedure which results in tightly or snugly fitting the tire to its metallic base-band by distension of either or both, may be followed. For an understanding of the scope of the invention, reference is therefore made to the accompanying claims.

Having thus described my invention, what I claim and desire to protect by Letters Patent is:

1. As an article of manufacture, a solid cushion tire recessed on its inner periphery to augment its cushioning capacity and under tension circumferentially, and a metallic base-band with integral flanges preventing lateral shift of the tire.

2. As an article of manufacture, a solid cushion tire recessed on its inner periphery to augment its cushioning capacity and under tension circumferentially, and a metallic base-band with integral flanges preventing lateral shift of the tire, said flanges converging toward the tread of the tire and compressingly gripping the side walls of the tire adjacent its seat on the base-band.

3. The process of making a unitary cushion tire and rim which consists in, amassing vulcanizable rubber tire constituents in the form of an annulus vulcanizing the annulus to form a tire having its inner periphery recessed to augment its cushioning capacity, mounting the tire upon a metallic base-band, bending over one or both margins of the metallic base-band to form side-flanges, and finally expanding the base-band to a size permitting pressure application to a wheel and to grip together the base-band and vulcanized tire.

4. The process of making a unitary cushion tire and rim which consists in, amassing vulcanizable rubber tire constituents in the form of an annulus vulcanizing the annulus to form a tire having its inner periphery recessed to augment its cushioning capacity, mounting the tire upon a metallic base-band, bending over one or both margins of the metallic base-band to form side-flanges, expanding the base-band to a predetermined size to permit press-fitting to a wheel and to grip together the base-band and vulcanized tire, and bending the side-flanges towards each other to grip and compress the portions of the tire contacting therewith.

5. In the manufacture of solid tires the steps of, assembling a vulcanized tire on a metallic base-band, turning up one or both margins of the base-band to form side-flanges, and subsequently expanding the assembled base-band and tire to a size adapted for pressure application to a wheel and thereby tensioning the tire about its metallic base-band.

Signed at New York city, county and State of New York, this 14th day of February, 1922.

LAURENCE R. DAVIS.